United States Patent [19]
Sato et al.

[11] Patent Number: 5,764,418
[45] Date of Patent: Jun. 9, 1998

[54] EYEPIECE SYSTEM

[75] Inventors: Tomoko Sato, Hachioji; Kazuyuki Tanaka, Chouhu, both of Japan

[73] Assignee: Olympus Optical Co., Ltd., Tokyo, Japan

[21] Appl. No.: 633,515

[22] Filed: Apr. 17, 1996

[30] Foreign Application Priority Data

Apr. 17, 1995 [JP] Japan .................. 7-114118

[51] Int. Cl.$^6$ ...................... G02B 25/00; G02B 13/18
[52] U.S. Cl. ............................ 359/646; 359/717
[58] Field of Search ........................ 359/646, 645, 359/644, 643, 717

[56] References Cited

U.S. PATENT DOCUMENTS

| | | | |
|---|---|---|---|
| 1,159,233 | 11/1915 | König. | |
| 3,472,577 | 10/1969 | Rosin et al. | 359/646 |
| 5,162,945 | 11/1992 | Matsuo et al. | 359/646 |
| 5,557,463 | 9/1996 | Ueno | 359/646 |

FOREIGN PATENT DOCUMENTS

| | | |
|---|---|---|
| 51-120231 | 10/1976 | Japan. |
| 7-159704 | 6/1995 | Japan. |

*Primary Examiner*—Scott J. Sugarman
*Attorney, Agent, or Firm*—Cushman, Darby & Cushman IP Group of Pillsbury, Madison & Sutro LLP

[57] ABSTRACT

An eyepiece system for use with binoculars, etc. which comprises, in order from a side of an observer's eye, a first convex lens element having a strongly convex surface on a side of an objective lens, and a cemented doublet lens component which consists of a second biconvex lens element and a third negative or negative meniscus lens element. This eyepiece system is configured to have a wide apparent field angle and favorably corrected aberrations by selecting an adequate value for a distance as measured from a front focal point of the eyepiece system to a vertex on a surface of the first lens element which is located on the side of the observer's eye.

23 Claims, 1 Drawing Sheet

EYEPIECE SYSTEM

BACKGROUND OF THE INVENTION a) Field of the Invention

The present invention relates to an eyepiece system which has an apparent field angle on the order of 50° and is to be used with binoculars, etc.

b) Description of the Prior Art

Known as a conventional example of the eyepiece system according to the present invention is an eyepiece system disclosed by Japanese Patent Koukoku Publication No. Sho 57-52,569. This conventional example is an eyepiece system which is composed of two lens components of three lens elements. However, this example has a large total length. Further, this conventional eyepiece system uses a convex lens element and a cemented lens component consisting of two lens elements, has a narrow apparent field angle of 40° to 50°, and allows astigmatism, coma and distortion to be produced in large amounts when an attempt is made on this eyepiece system to widen the apparent field angle thereof.

SUMMARY OF THE INVENTION

A primary object of the present invention is to provide an eyepiece system which has a short total length and favorably corrected aberrations, and is composed of a small number of lens elements.

The eyepiece system according to the present invention consists, in order from a side of an observer's eye, of a first convex lens element having a strongly convex surface on a side of an objective lens, and a cemented doublet lens component which consists of a second biconvex lens element and a third negative lens element. This eyepiece system is configured to satisfy the following condition (1):

$$1.40f < D < 1.48f \quad (1)$$

wherein the reference symbol D represents a distance as measured from a front focal point of the eyepiece system to a vertex of a surface of the first lens element which is located on the side of the observer's eye and the reference symbol f designates a focal length of the eyepiece system as a whole.

It is desirable for the eyepiece system according to the present invention to configure the third lens element as a negative meniscus lens element.

Further, the eyepiece system according to the present invention is composed, in order from the side of the observer's eye, of a first positive lens element having a strongly convex surface on the side of the objective lens, and a cemented doublet lens component consisting of a second biconvex lens element and a third negative lens element. This eyepiece system is configured to satisfy the following condition (2):

$$1.12f < |r_2| < 1.55f \quad (2)$$

wherein the reference symbol $r_2$ represents a radius of curvature on a surface of the first lens element which is located on the side of the objective lens.

For the eyepiece system which has the composition described above and is configured to satisfy the condition (2), it is more desirable to use a biconcave lens element as the third lens element. It is still further desirable to configure the eyepiece system so as to satisfy, in place of the condition (2), the following condition (2-1):

$$1.22f < |r_2| < 1.46f \quad (2-1)$$

Furthermore, the eyepiece system according to the present invention uses a negative meniscus lens element as the third lens element and is configured to satisfy, in place of the condition (2), the following condition (2-2):

$$1.2f < |r_2| < 1.4f \quad (2-2)$$

The eyepiece system according to the present invention which uses the meniscus lens element as the third lens element is configured to satisfy the following condition (3):

$$5.6f < |r_5| < 9.0f \quad (3)$$

wherein the reference symbol $r_5$ represents a radius of curvature on a surface of the third lens element which is located on the side of the objective lens.

It is desirable to configure the eyepiece system so as to satisfy, in place of the condition (3), the following condition (3-1):

$$5.6f < |r_5| < 6.5f \quad (3-1)$$

It is further desirable for the eyepiece system according to the present invention that the third lens element is a biconcave lens element and that the cemented lens component has a cemented surface which satisfies the following condition (4):

$$1.13f \leq |r_4| \leq 1.6f \quad (4)$$

wherein the reference symbol $r_4$ represents a radius of curvature on the cemented surface.

It is more desirable to configure the cemented surface so as to satisfy, in place of the condition (4), the following condition (4-1):

$$1.15f < |r_4| < 1.5f \quad (4-1)$$

It is still further desirable for the eyepiece system according to the present invention that the first lens element has a refractive index $n_1$ which satisfies the following condition (5):

$$n_1 \geq 1.615 \quad (5)$$

DETAILED DESCRIPTION OF THE PREFERRED EMBODIMENTS

Figure 1:
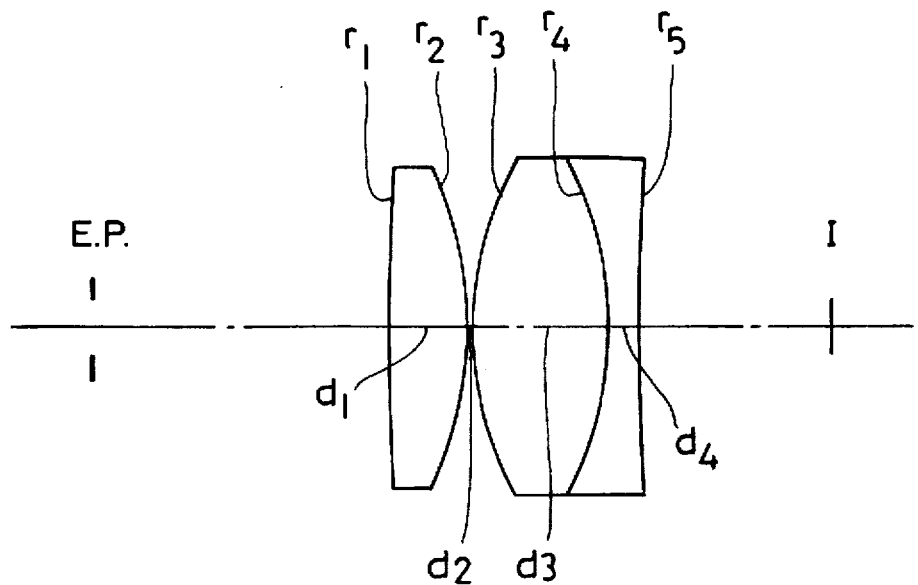
FIG. 1 shows a sectional view illustrating a composition of each of first through fifth embodiments of the eyepiece system according to the present invention.
Figure 2:
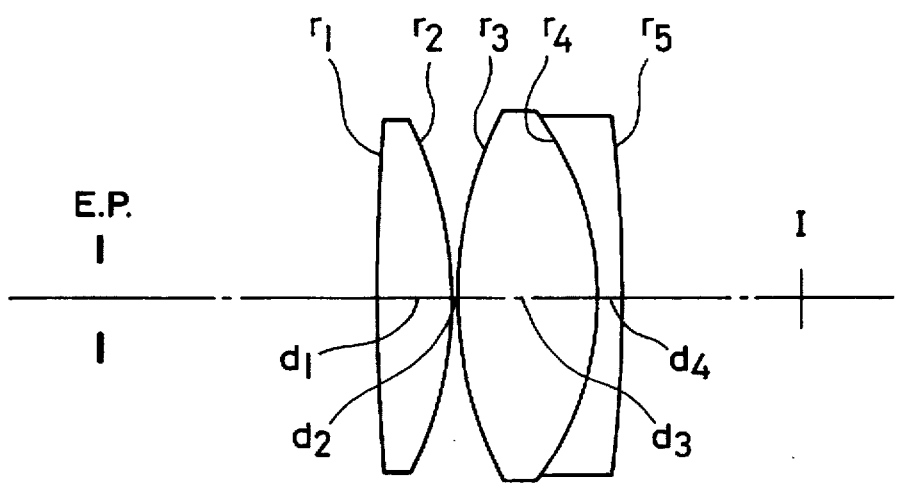
FIG. 2 shows a sectional view illustrating a composition of each of sixth through ninth embodiments of the present invention.

The eyepiece system according to the present invention has a composition illustrated in FIG. 1 or FIG. 2, wherein the reference symbol I represents a location of an image formed by an objective lens which is disposed on the right side in the drawing, but not shown, and the reference symbol E.P. represents an eye point.

The eyepiece system according to the present invention has a composition illustrated in FIG. 1 or FIG. 2, or is composed, in order from a side of an observer's eye, of a first positive lens element having a strongly convex surface on a side of an objective lens, and a cemented doublet lens component which consists of a second biconvex lens element and a third biconcave or negative meniscus lens element. This eyepiece system is configured to satisfy the following condition (1):

$$1.40f < D < 1.48f \qquad (1)$$

A field stop is ordinarily disposed at a location of a primary imaging surface of an objective lens or a front focal point of an eyepiece system. In order to configure an eyepiece system as a whole including a field stop so as to have a short total length, it is therefore necessary to shorten a distance as measured from the front focal point of the eyepiece system to a vertex on a surface of a first lens element which is located on the side of the observer's eye.

The condition (1) defines, in terms of a focal length of the eyepiece system, a distance D as measured from the front focal point of the eyepiece system to the vertex on the surface of the first lens element which is located on the side of the observer's eye. If the upper limit of 1.48f of the condition (1) is exceeded, the eye-piece system will have a large total length, thereby enlarging binoculars using the eyepiece system. If the lower limit of 1.40f of the condition (1) is exceeded, in contrast, the lens elements will have radii of curvature too short for an effective diameter which is determined mainly by an apparent field angle, whereby coma which is an offaxial aberration will be aggravated and can hardly be corrected.

Further, the eyepiece system according to the present invention has the composition illustrated in FIG. 1 or FIG. 2, wherein it is composed, in order from the side of the observer's eye, of a first convex lens element having a strongly convex surface on the side of the objective lens, and a cemented doublet lens component which consists of a second biconvex lens element and a third biconcave or negative meniscus lens element. This eyepiece system is configured to satisfy the following condition (2):

$$1.12f \leq |r_2| \leq 1.55f \qquad (2)$$

The condition (2) defines a radius of curvature on a surface of the first lens element which is located on the side of the objective lens, and is required for maintaining the required field angle and correcting coma as well as astigmatism. If $|r_2|$ exceeds the lower limit of 1.12f of the condition (2), coma will be produced in a large amount. If $|r_2|$ exceeds the upper limit of 1.55f, of the condition (2), in contrast, astigmatism (in the meridional direction) will be badly curved. When the third lens element is biconcave, aberrations can be corrected more favorably by modifying the condition (2) so as to have an upper limit of 1.46f and a lower limit of 1.22f, or configuring the eyepiece system so as to satisfy the following condition (2-1):

$$1.22f < |r_2| < 1.46f \qquad (2-1)$$

Further, the eyepiece system according to the present invention uses a negative meniscus lens element as the third lens element as shown in FIG. 2 and is configured to satisfy the above-mentioned condition (2).

Furthermore, it is desirable that the eyepiece system according to the present invention uses a negative meniscus lens element as the third lens element and is configured so as to satisfy, in place of the above-mentioned condition (2), the following condition (2-2):

$$1.2f < |r_2| < 1.4f \qquad (2-2)$$

Moreover, the eyepiece system according to the present invention has the composition illustrated in FIG. 2 and is configured to satisfy the following condition (3):

$$5.6f < |r_5| < 9.0f \qquad (3)$$

The condition (3) defines, in terms of the focal length f of the eyepiece system as a whole, a radius of curvature $r_5$ on a surface of the third lens element which is located on the side of the objective lens. If $|r_5|$ exceeds the upper limit of 9.0f of the condition (3), it will be impossible to prevent distortion from being produced by the surface of the third lens element which is located on the side of the objective lens. If $|r_5|$ exceeds the lower limit of 5.6f of the condition (3), coma which is an offaxial aberration will be undercorrected.

Further, it is desirable to modify the condition (3) so as to have an upper limit of 6.5f, or configure the eyepiece system so as to satisfy the following condition (3-1):

$$5.6f < |r_5| < 6.5f \qquad (3-1)$$

For favorable correction also of offaxial aberrations in an eyepiece system which is composed of a small number of lens elements and has a wide field angle, it is desirable to configure the cemented surface so as to have a radius of curvature $|r_5|$ which is shorter than the upper limit of 6.5f of the condition (3-1).

In addition, the eyepiece system according to the present invention has the composition illustrated in FIG. 1 and is characterized in that the cemented doublet lens component satisfies the condition (4) mentioned below. Speaking more concretely, the eyepiece system according to the present invention is composed, in order from the side of the observer's eye, of a first convex lens element having a strongly convex surface on the side of the objective lens, and a cemented doublet lens component which consists of a second biconvex lens element and a third biconcave lens element; and characterized in that it satisfies the following condition (4):

$$1.13f \leq |r_4| \leq 1.6f \qquad (4)$$

wherein the reference symbol f represents a focal length of the eyepiece system as a whole and the reference symbol $r_4$ designates a radius of curvature on a cemented surface of the cemented doublet lens component (a surface between the second lens element and the third lens element).

The condition (4) which defines the radius of curvature on the cemented surface is required for configuring the cemented surface so as to have a radius of curvature which is short enough to cancel coma produced by the surface of the first lens element which is located on the side of the objective lens. If $|r_4|$ exceeds the upper limit of 1.6f of the condition (4), the cemented surface can hardly cancel the coma produced by the surface $r_2$ of the first lens element. If the lower limit of 1.13f of the condition (4) is exceeded, astigmatism will be aggravated.

Aberrations can be corrected more favorably by modifying the condition (4) so as to have an upper limit of 1.5f and a lower limit of 1.15f, or selecting $|r_4|$ so as to satisfy the condition (4-1) shown below. Further, it is possible, by shortening the radius of curvature $r_4$ to a certain degree, to prolong a distance to an eye point so that the cemented surface will largely spring up rays and allow the rays to be incident high on the first lens element:

$$1.15f < |r_4| < 1.5f \qquad (4\text{-}1)$$

As an eyepiece system which accomplishes the object described above, the present invention provides an eyepiece system which has the composition described in FIG. 1 or FIG. 2 and satisfies the condition (5) shown below. Speaking more concretely, the eyepiece system according to the present invention is composed, in order from the side of the observer's eye, of a first positive lens element having a strongly convex surface on the side of the objective lens, and a cemented doublet lens component which consists of a second biconvex lens element and a third biconcave or negative meniscus lens element; and characterized in that it satisfies the following condition (5):

$$n_1 \geq 1.615 \qquad (5)$$

wherein the reference symbol $n_1$ represents a refractive index of said first lens element.

The condition (5) which defines the refractive index of the first lens element is required for suppressing distortion to a low level and reserving sufficient marginal thickness of the first lens element. If the lower limit of 1.615 of the condition (5) is exceeded, the first lens element will have a short radius of curvature on a surface thereof which is located on the side of the observer's eye, thereby making it difficult to correct distortion favorably. When a high refractive index is selected for the first lens element so that it has a long radius of curvature on the surface located on the side of the observer's eye, it is possible to reserve sufficient marginal thickness of the first lens element even when it has a long diameter and prolong a distance to an eye point.

Aberrations can be corrected more favorably by using an aspherical surface in the eyepiece system according to the present invention.

Though the eyepiece system according to the present invention exhibits favorable optical performance when it is configured to satisfy the condition (1), (2), (3), (4) or (5), it is more desirable to configure the eyepiece system so as to satisfy a plurality of these conditions.

Now, the preferred embodiments of the eyepiece system according to the present invention will be described below in a form of numerical data:

Embodiment 1
focal length f = 100 mm, field angle 2ω = 50.1°,
aperture ratio = 1:5.47

$r_1 = 1226.557$
$\qquad d_1 = 25.1 \qquad n_1 = 1.69680 \qquad v_1 = 55.5$
$r_2 = -125.928$
$\qquad d_2 = 1.8$ $r_3 = 118.766$
$\qquad d_3 = 43.8 \qquad n_2 = 1.62299 \qquad v_2 = 58.2$
$r_4 = -118.766$
$\qquad d_4 = 10.2 \qquad n_3 = 1.80518 \qquad v_3 = 25.4$
$r_5 = 3153.004$
D = 1.43f, $|r_2|$ = 1.26f, $|r_4|$ = 1.19f, $n_1$ = 1.69680

Embodiment 2
focal length f = 100 mm, field angle 2ω = 50.1°,
aperture ratio = 1:5.49

$r_1 = 665.247$
$\qquad d_1 = 23.9 \qquad n_1 = 1.62299 \qquad v_1 = 58.2$
$r_2 = -122.125$
$\qquad d_2 = 1.8$
$r_3 = 113.734$
$\qquad d_3 = 43.7 \qquad n_2 = 1.62299 \qquad v_2 = 58.2$
$r_4 = -115.109$
$\qquad d_4 = 10.2 \qquad n_3 = 1.80518 \qquad v_3 = 25.4$
$r_5 = 1993.096$
D = 1.41f, $|r_2|$ = 1.22f, $|r_4|$ = 1.15f, $n_1$ = 1.62299

Embodiment 3
focal length f = 100 mm, field angle 2ω = 50.1°,
aperture ratio = 1:5.49

$r_1 = 741.433$
$\qquad d_1 = 24.8 \qquad n_1 = 1.69680 \qquad v_1 = 55.5$
$r_2 = -131.800$
$\qquad d_2 = 1.8$
$r_3 = 112.327$
$\qquad d_3 = 43.7 \qquad n_2 = 1.62299 \qquad v_2 = 58.2$
$r_4 = -121.713$
$\qquad d_4 = 10.2 \qquad n_3 = 1.80518 \qquad v_3 = 25.4$
$r_5 = 855.445$
D = 1.41f, $|r_2|$ = 1.32f, $|r_4|$ = 1.22f, $n_1$ = 1.69680

Embodiment 4
focal length f = 100 mm, field angle 2ω = 50.1°,
aperture ratio = 1:5.46

$r_1 = 770.836$
$\qquad d_1 = 25.1 \qquad n_1 = 1.69680 \qquad v_1 = 55.5$
$r_2 = -145.378$
$\qquad d_2 = 1.8$
$r_3 = 113.012$ (aspherical surface)
$\qquad d_3 = 44.0 \qquad n_2 = 1.62299 \qquad v_2 = 58.2$
$r_4 = -123.393$
$\qquad d_4 = 10.3 \qquad n_3 = 1.80518 \qquad v_3 = 25.4$
$r_5 = 36885.099$ aspherical surface coefficients $E = -0.32803 \times 10^{-7}$, $F = 0.93282 \times 10^{-13}$,
$G = 0.12568 \times 10^{-14}$
D = 1.44f, $|r_2|$ = 1.45f, $|r_4|$ = 1.23f, $n_1$ = 1.69680

| Embodiment 5 |
| --- |
| focal length f = 100 mm, field angle 2ω = 50.1°, aperture ratio = 1:5.48 |
| $r_1 = 1270.106$ (aspherical surface) |
|     $d_1 = 25.0$    $n_1 = 1.69680$    $v_1 = 55.5$ |
| $r_2 = -127.416$ |
|     $d_2 = 1.8$ |
| $r_3 = 116.861$ |
|     $d_3 = 43.8$    $n_2 = 1.62299$    $v_2 = 58.2$ |
| $r_4 = -149.751$ |
|     $d_4 = 10.2$    $n_3 = 1.80518$    $v_3 = 25.4$ |
| $r_5 = 1323.515$ |
| aspherical surface coefficients |
| $E = -0.40942 \times 10^{-7}$, $F = 0.42179 \times 10^{-11}$, $G = 0.60560 \times 10^{-16}$ |
| $D = 1.43f$, $|r_2| = 1.27f$, $|r_4| = 1.50f$, $n_1 = 1.69680$ |

| Embodiment 6 |
| --- |
| focal length f = 100 mm, field angle 2ω = 55.6° |
| $r_1 = 1192.1780$ |
|     $d_1 = 24.7024$    $n_1 = 1.72916$    $v_1 = 54.68$ |
| $r_2 = -136.1591$ |
|     $d_2 = 1.3353$ |
| $r_3 = 142.5704$ |
|     $d_3 = 49.0710$    $n_2 = 1.62280$    $v_2 = 57.04$ |
| $r_4 = -105.3278$ |
|     $d_4 = 8.3454$    $n_3 = 1.78472$    $v_3 = 25.68$ |
| $r_5 = -603.4877$ |
| $D = 1.47f$, $|r_2| = 1.36f$, $|r_5| = 6.03f$, $n_1 = 1.72916$ |

| Embodiment 7 |
| --- |
| focal length f = 100 mm, field angle 2ω = 55.6° |
| $r_1 = 1489.2897$ |
|     $d_1 = 24.3652$    $n_1 = 1.72916$    $v_2 = 54.68$ |
| $r_2 = -136.4514$ |
|     $d_2 = 1.3382$ |
| $r_3 = 142.3609$ |
|     $d_3 = 49.1788$    $n_2 = 1.62280$    $v_2 = 57.04$ |
| $r_4 = -105.3591$ |
|     $d_4 = 8.3637$    $n_3 = 1.78472$    $v_3 = 25.68$ |
| $r_5 = 533.4068$ |
| $D = 1.47f$, $|r_2| = 1.36f$, $|r_5| = 5.33f$, $n_1 = 1.72916$ |

| Embodiment 8 |
| --- |
| focal length f = 100 mm, field angle 2ω = 55.6° |
| $r_1 = 6729.0474$ |
|     $d_1 = 24.4161$    $n_1 = 1.72916$    $v_1 = 54.68$ |
| $r_2 = -129.7934$ |
|     $d_2 = 1.3626$ |
| $r_3 = 139.6318$ |
|     $d_3 = 49.6804$    $n_2 = 1.62280$    $v_2 = 57.64$ |
| $r_4 = -110.6638$ |
|     $d_4 = 8.5165$    $n_3 = 1.78472$    $v_3 = 25.68$ |
| $r_5 = -581.5476$ |
| $D = 1.48f$, $|r_2| = 1.30f$, $|r_5| = 5.81f$, $n_1 = 1.72916$ |

| Embodiment 9 |
| --- |
| focal length f = 100 mm, field angle 2ω = 55.6° |
| $r_1 = 2476.9854$ |
|     $d_1 = 24.8802$    $n_1 = 1.72916$    $v_1 = 54.68$ |
| $r_2 = -132.5761$ |
|     $d_2 = 1.3425$ |
| $r_3 = 139.7329$ |
|     $d_3 = 49.5975$    $n_2 = 1.62280$    $v_2 = 57.04$ |
| $r_4 = -106.7020$ |
|     $d_4 = 8.3904$    $n_3 = 1.78472$    $v_3 = 25.68$ |
| $r_5 = -583.4301$ |
| $D = 1.48f$, $|r_2| = 1.33f$, $|r_5| = 5.83f$, $n_1 = 1.72916$ | wherein the reference symbols $r_1, r_2, \ldots r_5$ represent radii of curvature on surfaces of respective lens elements which are disposed in order from the side of the observer's eye, the reference symbols $d_1, d_2, d_3$ and $d_4$ designate thicknesses of the respective lens elements and airspaces reserved therebetween, the reference symbols $n_1, n_2$ and $n_3$ denote refractive indices of the respective lens elements, and the reference symbols $v_1, v_2$ and $v_3$ represents Abbe's numbers of the respective lens elements.

Departures X from reference spheres (deviations in directions of optical axes) of the aspherical surfaces used in the embodiments described above are expressed by the formula shown below:

$$X = \frac{y^2/r}{1 + \sqrt{1 - (y/r)^2}} + Ey^4 + Fy^6 + Gy^8$$

wherein the reference symbol Y represent a height as measured from an optical axis, the reference symbol r designates a radius of curvature on a reference sphere of an aspherical surface of interest, and the reference symbols E, F and G denote aspherical surface coefficients of 4th, 6th and 8th orders respectively.

Each of the eyepiece systems preferred as the first through fifth embodiments described above has the composition illustrated in FIG. 1, whereas each of the eyepiece systems preferred as the sixth through ninth embodiments has the composition shown in FIG. 2.

The fourth embodiment and the fifth embodiment adopt aspherical surfaces as the third surface ($r_3$) and the first surface ($r_1$) respectively.

We claim:

1. An eyepiece system comprising, in order from a side of an observer's eye:

a first positive lens element having a stronger curvature on a convex surface provided on a side of an objective lens than a curvature of a surface provided on a side of said observer's eye and a cemented lens component which consists of, in order from a side of an observer's eye, a second biconvex lens element and a third negative lens element, wherein said eyepiece system satisfies the following condition (1):

$$1.40f < D < 1.48f \quad (1)$$

wherein the reference symbol D represents a distance as measured from a front focal point of said eyepiece system to a vertex of a surface of said first positive lens element which is on the side of the observer's eye and the reference symbol f designates a focal length of the eyepiece system as a whole.

2. An eyepiece system according to claim 1 wherein said third lens element is a negative meniscus lens element.

3. An eyepiece system according to claim 1 wherein said third lens element is a biconcave lens element.

4. An eyepiece system according to claim 2 or 3 satisfying the following condition (2):

$$1.12f<|r_2|<1.55f \tag{2}$$

wherein the reference symbol $r_2$ represents a radius of curvature on the surface of said first lens element located on the side of the objective lens.

5. An eyepiece system according to claim 2 satisfying the following condition (2-2):

$$1.2f<|r_2|<1.4f \tag{2-2}$$

wherein the reference symbol $r_2$ represents a radius of curvature on the surface of said first lens element located on the side of the objective lens.

6. An eyepiece system according to claim 2 satisfying the following condition (3):

$$5.6f<|r_5|<9.0f \tag{3}$$

wherein the reference symbol $r_5$ represents a radius of curvature on a surface of said third lens element located on the side of the objective lens.

7. An eyepiece system according to claim 2 satisfying the following condition (3-1):

$$5.6f<|r_5|<6.5f \tag{3-1}$$

wherein the reference symbol $r_5$ represents a radius of curvature on a surface of said third lens element located on the side of the objective lens.

8. An eyepiece system according to claim 3 satisfying the following condition (4-1):

$$1.15f<|r_4|\leq 1.5f \tag{4-1}$$

wherein the reference symbol f represents a focal length of the eyepiece system as a whole and the reference symbol $r_4$ designates a radius of curvature on a cemented surface of the cemented lens component.

9. An eyepiece system comprising, in order from a side of an observer's eye:

a first positive lens element having a stronger curvature on a convex surface provided on a side of an objective lens than a surface provided on a side of said observer's eye and a cemented lens component which consists, in order from said side of an observer's eye, of a second biconvex lens element and a third negative lens element, wherein said eyepiece system satisfies the following condition:

$$1.2f<|r_2|<1.4f$$

wherein the reference symbol $r_2$ represents a radius of curvature on the surface of said first lens element located on the side of the objective lens and the reference symbol f designates a focal length of said eyepiece system as a whole.

10. An eyepiece system according to claim 9 wherein said third lens element is a biconcave lens element and satisfies the following condition (4):

$$1.13f\leq|r_4|\leq 1.6f \tag{4}$$

wherein the reference symbol f represents a focal length of the eyepiece system as a whole and the reference symbol $r_4$ designates a radius of curvature on a cemented surface of the cemented lens component.

11. An eyepiece system according to claim 10 further satisfying the following condition (5):

$$n_1 \geq 1.615 \tag{5}$$

wherein the reference symbol $n_1$ represents a refractive index of the first lens element.

12. An eyepiece system according to claim 9 further satisfying the following condition (5):

$$n_1 \geq 1.615 \tag{5}$$

wherein the reference symbol $n_1$ represents a refractive index of the first lens element.

13. An eyepiece system comprising, in order from a side of an observer's eye: a first positive lens element having a stronger curvature on a convex surface provided on a side of an objective lens than a surface provided on a side of said observer's eye and a cemented lens component which consists, in order from said side of an observer's eye, of a second biconvex lens element and a third biconcave lens element, wherein said eyepiece system satisfies the following condition:

$$1.15f\leq|r_4|\leq 1.5f$$

wherein the reference symbol f represents a focal length of the eyepiece system as a whole and the reference symbol $r_4$ designates a radius of curvature on the cemented surface of the cemented lens component.

14. An eyepiece system according to claim 13 further satisfying the following condition (5):

$$n_1 \geq 1.615 \tag{5}$$

wherein the reference symbol $n_1$ represents a refractive index of the first lens element.

15. An eyepiece system according to claim 14 wherein said eyepiece system satisfies the following condition (2-1):

$$1.22f<|r_2|<1.46f \tag{2-1}$$

wherein the reference symbol $r_2$ represents a radius of curvature on the surface of said first lens element located on the side of the objective lens and the reference symbol f designates a focal length of said eyepiece system as a whole.

16. An eyepiece system comprising, in order from a side of an observer's eye:

a first positive lens element having a stronger curvature on a convex surface provided on a side of an objective lens than a surface provided on a side of said observer's eye and a cemented lens component which consists, in order from said side of an observer's eye, of a second biconvex lens element and a third biconcave lens element, wherein said eyepiece system satisfies the following condition:

$$1.2f<|r_2|<1.4f$$

wherein the reference symbol $r_2$ represents a radius of curvature on the surface of said first lens element located on the side of the objective lens and the reference symbol f designates a focal length of said eyepiece system as a whole.

17. An eyepiece system comprising, in order from a side of an observer's eye:

a first positive lens element having a stronger curvature on a convex surface provided on a side of an objective lens than a surface provided on a side of said observer's eye and a cemented lens component which consists, in order from said side of an observer's eye, of a second biconvex lens element and a third negative meniscus lens element, wherein said eyepiece system satisfies the following condition (2-2):

$$1.2f<|r_2|<1.4f \qquad (2\text{-}2)$$

wherein the reference symbol $r_2$ represents a radius of curvature on the surface of said first lens element located on the side of the objective lens and the reference symbol f designates a focal length of said eyepiece system as whole.

18. An eyepiece system according to claim 17 wherein said third lens element is a negative meniscus lens element and said eyepiece system satisfies the following condition (5):

$$n_1 \geq 1.615 \qquad (5)$$

wherein the reference symbol $n_1$ represents a refractive index of said first lens element.

19. An eyepiece system according to claim 17 satisfying the following condition (3):

$$5.6f<|r_5|<9.0f \qquad (3)$$

wherein the reference symbol $r_5$ represents a radius of curvature on a surface of said third lens element located on the side of the objective lens.

20. An eyepiece system according to claim 18 satisfying the following condition (3-1):

$$5.6f<|r_5|<6.5f \qquad (3\text{-}1)$$

wherein the reference symbol $r_5$ represents a radius of curvature on a surface of said third lens element located on the side of the objective lens.

21. An eyepiece system comprising, in order from a side of an observer's eye:

a first positive lens element having a stronger curvature on a convex surface provided on a side of an objective lens than a surface provided on a side of said observer's eye and a cemented lens component which consists, in order from said side of an observer's eye, of a second biconvex lens element and a third negative lens element, wherein said eyepiece system satisfies the following condition (5):

$$n_1 \geq 1.615 \qquad (5)$$

wherein the reference symbol $n_1$ represents a refractive index of said first lens element.

22. An eyepiece system comprising, in order from a side of an observer's eye:

a first biconvex lens element having a stronger curvature on a convex surface provided on a side of an objective lens than on a surface provided on a side of said observer's eye; and a cemented lens component which consists, in order from said side of an observer's eye, of a second biconvex lens element and a third negative lens elements, wherein said eyepiece system satisfies the following condition (5):

$$n_1 \geq 1.615 \qquad (5)$$

wherein the reference symbol $n_1$ represents a refractive index of said first lens element.

23. An eyepiece system according to claim 21 wherein said third lens element is a negative meniscus lens element and said eyepiece system satisfies the following condition (3):

$$5.6f<|r_5|<9.0f \qquad (3)$$

wherein the reference symbol $r_5$ represents a radius of curvature on a surface of said third lens element located on the side of the objective lens.

* * * * *